(12) United States Patent
Dibrino et al.

(10) Patent No.: US 6,542,915 B1
(45) Date of Patent: Apr. 1, 2003

(54) FLOATING POINT PIPELINE WITH A LEADING ZEROS ANTICIPATOR CIRCUIT

(75) Inventors: Michael Thomas Dibrino, Austin, TX (US); Faraydon Osman Karim, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,284

(22) Filed: Jun. 17, 1999

(51) Int. Cl.⁷ .................................................. G06F 7/38
(52) U.S. Cl. ...................................................... 708/501
(58) Field of Search ........................................ 708/501

(56) References Cited

U.S. PATENT DOCUMENTS

| | | | | |
|---|---|---|---|---|
| 4,969,118 A | * | 11/1990 | Montoye et al. | 708/501 |
| 5,392,228 A | * | 2/1995 | Burgess et al. | 708/495 |
| 5,530,663 A | * | 6/1996 | Garcia et al. | 708/501 |
| 5,757,686 A | * | 5/1998 | Naffziger et al. | 708/501 |
| 5,790,444 A | * | 8/1998 | Olson et al. | 708/501 |
| 5,796,644 A | * | 8/1998 | Jiang | 708/501 |
| 5,892,698 A | * | 4/1999 | Naffziger | 708/501 |
| 5,928,316 A | * | 7/1999 | Wong et al. | 708/501 |
| 5,993,051 A | * | 11/1999 | Jiang et al. | 708/501 |

* cited by examiner

*Primary Examiner*—Tan V. Mai
(74) *Attorney, Agent, or Firm*—Kelly Kordzik; Winstead Sechrest & Minick P.C.; Casimer K. Salys

(57) ABSTRACT

Presented is a "high-order" Leading Zeros Anticipator or LZA circuit and specifically a five-input LZA. The prior-art two-input LZA circuit is part of almost all high-performance floating-point units or FPUs. The advantages of a high-order LZA (such as five-input) is that the LZA function may be started and finished sooner in the floating point pipeline, and therefore allows more time for other functions in the pipeline. Therefore, a high-order LZA, such as five-input LZA, may be faster than the prior art two-input LZA designs. Thus, speeding up the LZA function in a floating point pipeline may significantly increase the speed in which the overall floating-point unit may operate as compared to the prior-art two input LZA designs and may additionally inspire new floating-point michroarchitectures which may yield further performance gains.

3 Claims, 8 Drawing Sheets

US 6,542,915 B1

FLOATING POINT PIPELINE WITH A LEADING ZEROS ANTICIPATOR CIRCUIT

TECHNICAL FIELD

The present invention relates in general to data processing systems, and in particular, to a leading zeros anticipator used in floating-point pipelines.

BACKGROUND INFORMATION

Typically, floating point pipelines provide some means for renormalizing floating point data after performing some arithmetic operation, such as an add, multiply, divide, or subtract. Recall that a normalized number is one in which there is exactly one leading '1' prior to the binary point in the mantissa. Since the result of the leading '1' after an arithmetic operation may vary prior to normalization, the position of the leading '1' must be calculated prior to normalization.

For any arithmetic operation which performs an effective add of the operands (in which "effective add" is defined as the addition of two positive or two negative operands, or the subtraction of a negative operand from a positive operand), the position of the leading "1" in the sum is easily calculated within a one binary-digit uncertainty by comparing the magnitudes of the operands' exponents and choosing the position of the leading "1" in the operand with the largest exponent.

For an effective subtract operation, the operands may result in massive cancellation, and a large number of leading zeros may be generated in the resulting sum. The position of the leading "1" can be detected by either a "Leading Zeros Detector" (LZD) circuit, or anticipated by a "Leading Zeros Anticipator" (LZA) circuit.

A "Leading Zeros Detector" is typically implemented as an N-way "OR" gate, one for each bit position in the sum. Each bit is an effective "OR" of all the preceding bits. In this way, a vector is generated which indicates the position of the first leading "1" in the sum. A disadvantage of the LZD is that it introduces additional delay because the sum must be completed before the leading zero may be detected.

A "Leading Zeros Anticipator" avoids some of this additional delay by computing or anticipating the position of the first leading "1" in parallel with the final add which generates the sum. In this way, much of the delay of the LZD can be "hidden", at the cost of some slight additional hardware.

A disadvantage of the LZA is that not all of the extra delay can be hidden. Typically, the output of the LZA is encoded to provide two functions (typically in the next pipeline stage). The first function, is a "Count Leading Zeros" (CLZ) value which is simply a binary representation of the position of the first leading "1" in the sum. The second function provided by the LZA is that of the normalizer mux (multiplexor) selects, also used in the next pipeline stage. This encoding for either function can be very time-consuming and delays the normalization process.

Many FPU (floating point unit) designs already use the most efficient method of recoding the LZA output into a CLZ value and normalizer mux select signals. Therefore, the only method of speeding up the entire LZA function is apparently to begin computation of the LZA vector earlier than is currently performed.

SUMMARY OF THE INVENTION

The present invention addresses the foregoing need by providing a five-input LZA architecture which can compute the LZA based on five inputs rather than the two inputs used by all LZA implementations prior to this invention. By beginning computation of the LZA with five inputs, the LZA inputs can be moved up to two stages prior to the adder inputs. Usually, these two stages are composed of "Carry-Save Adders" (CSAs), also sometimes known as "Compressors." By bypassing these two additional CSA stages, computation of the LZA function may begin and end sooner, allowing for significantly faster pipeline and thus processor speeds.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figures 1, 1A:
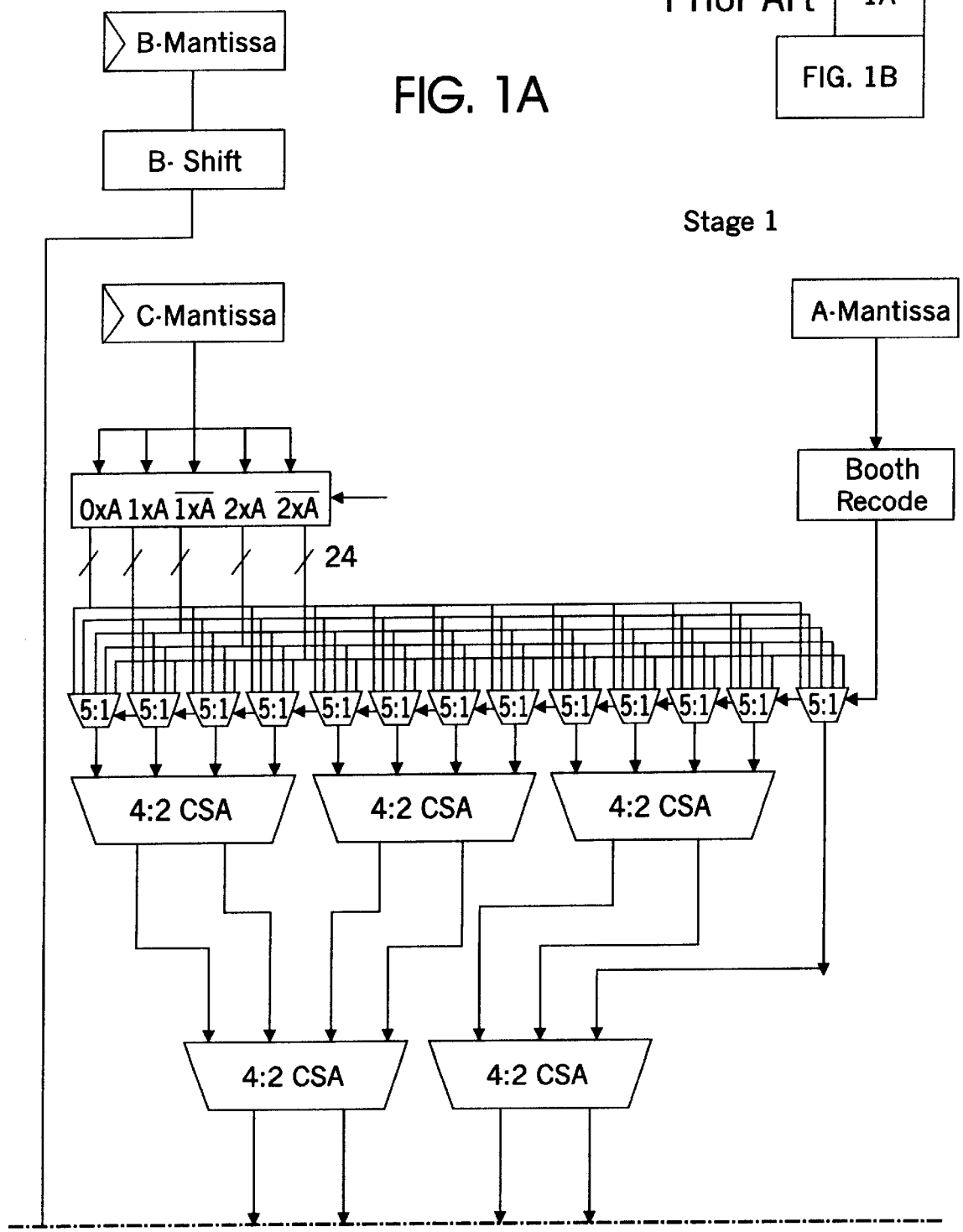
FIGS. 1A–1B illustrate, in block diagram form, a floating-point pipeline using a prior art 2-input LZA.
Figure 1B:
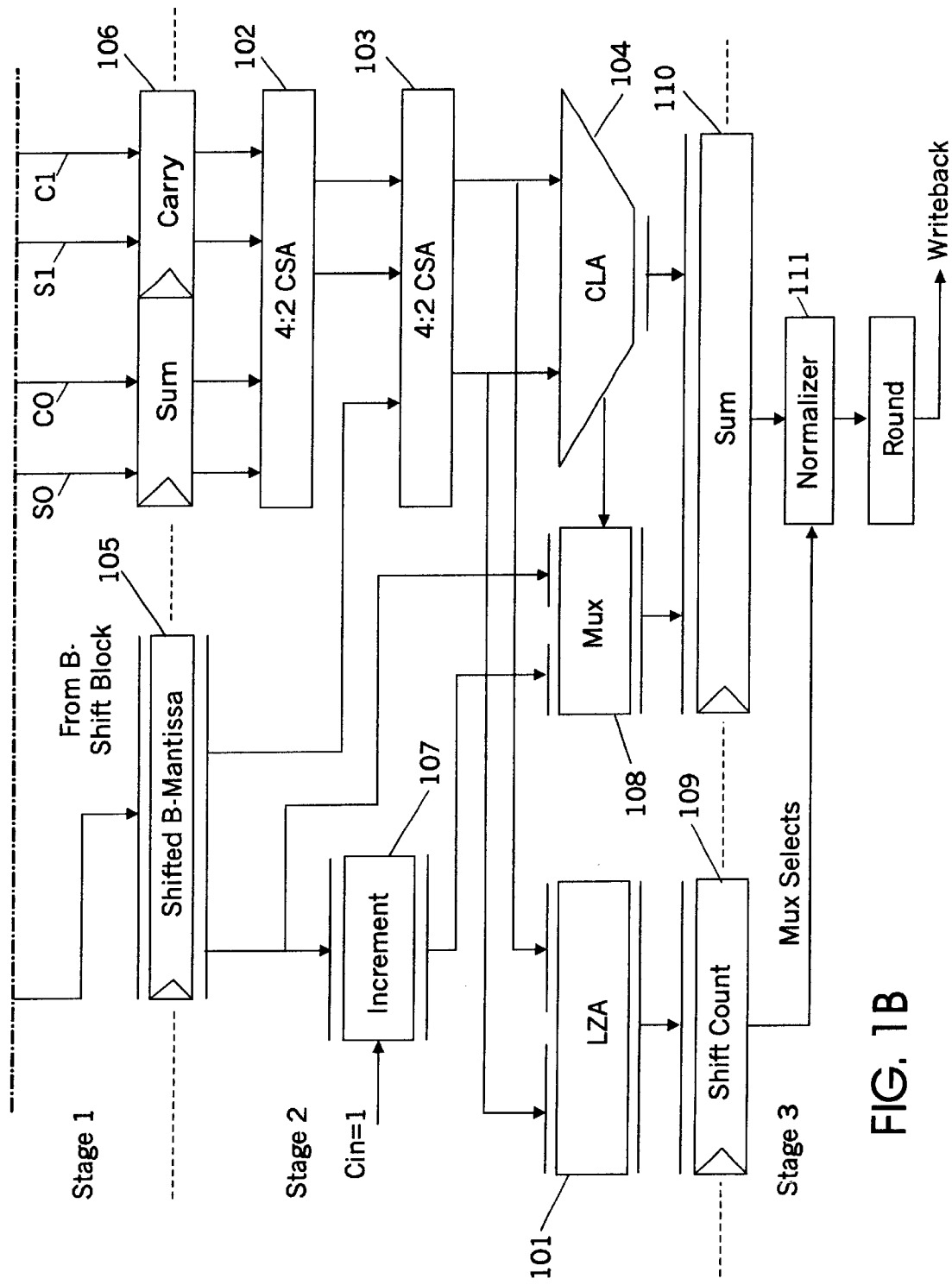

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates a typical floating-point pipeline. This diagram shows the "Mantissa" dataflow only (the exponent dataflow logic is not shown).

Figure 6:
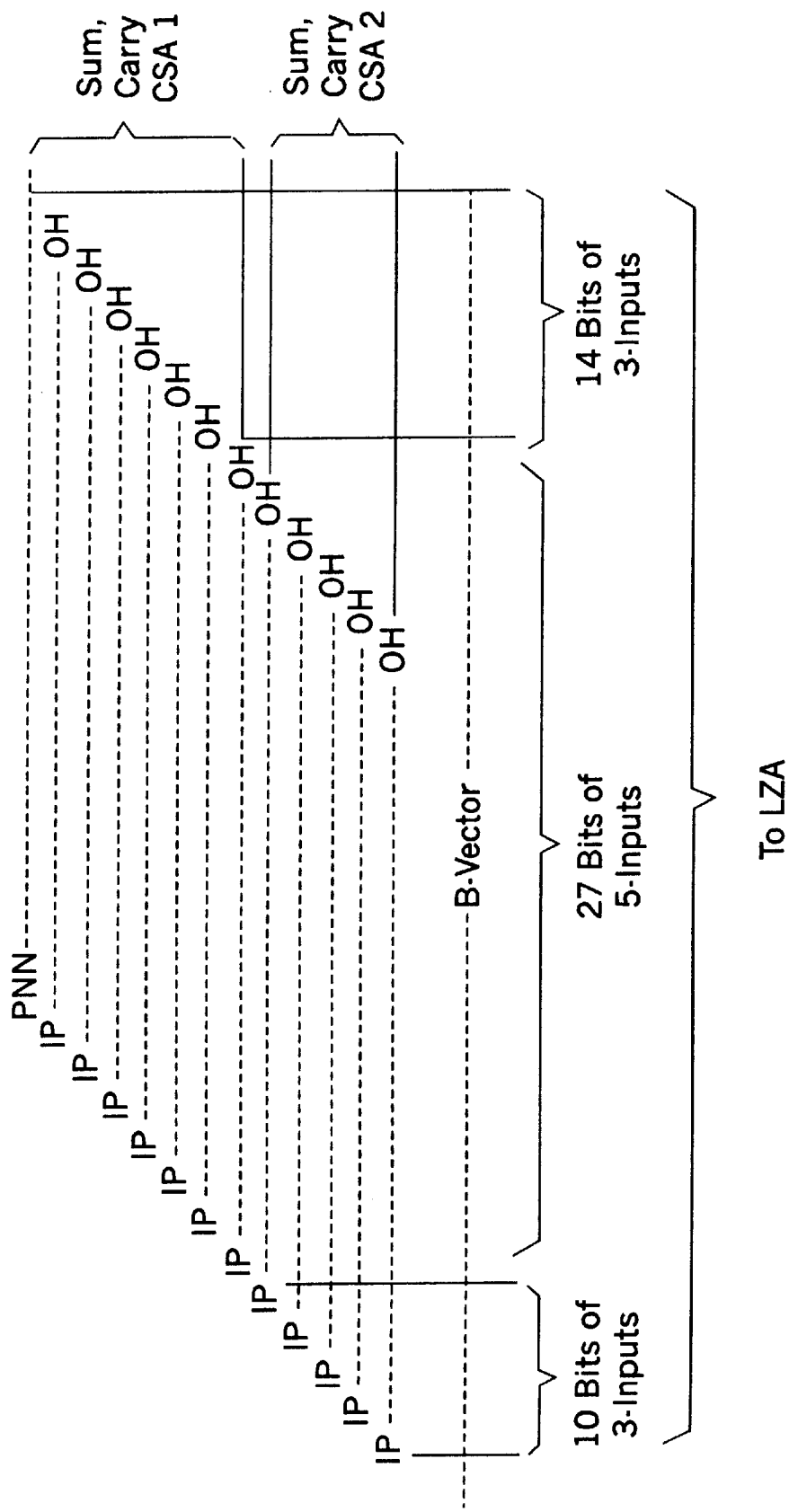
FIG. 6 illustrates a Wallace tree using "1P" encoding for a single-precision multiplier.

This pipeline performs the operation A*C+B, in which A and C Mantissas are first multiplied together and the result is added to a shifted B-Mantissa. Boxes labeled with a small triangle on the left side represent latches. The A and C Mantissas are encoded with Radix-4 Booth Encoding to form thirteen partial products. These thirteen partial products are shown in FIG. 6. In FIG. 6, the dashes ("–") represent the 25 bits of each partial product. Since this is a Radix-4 encoding, each partial product is shifted to the left by two bits with respect to the previous partial product. A "P" symbol means that this bit is a "1" when the current row is a positive multiple of "A". An "N" symbol means that this bit is a "1" when the current row is a negative multiple of "A". An "H" symbol means that this bit is a "1" when the row above is a negative multiple of "A".

The A*C product is "compressed" into four sets of bits, S0, C0, S1, and C1 representing SUM0, CARRY0, SUM1, and CARRY1, respectively. In the same pipeline stage, the Mantissa of B is shifted right such that the exponents of the A*C product and the B-Mantissa are equal (similar to how one operand is shifted in a pencil and paper calculation). The shifted B-Mantissa plus the SUM0 (S0), CARRY0 (C0), SUM1 (S1), and CARRY1 (C1) terms are all latched at this point.

4:2 CSA 102 further compresses the SUM0, CARRY0, SUM1, and CARRY1 terms into two new SUM and CARRY terms. A portion of the shifted-B mantissa is added to the A*C product from 4:2 CSA 102 in 4:3 CSA 103. The output of 3:2 CSA 103 is added by carry-lookahead adder (CLA) block 104.

It is important to note that the A*C product is 48 bits wide with at most two bits to the left of the implied decimal point. Any bits of the shifted B-operand that are to the left of these two bits do not require a full adder. Instead, these bits to the left of A*C require only to be incremented if the carry-out of the adder is a "1". This is the reason for the incrementer 107 and the mux 108. This description will be familiar to anyone with knowledge of floating-point hardware.

Finally, it is recognized that the prior art uses a two-input leading zero anticipator (LZA) block 101 to produce the position of the leading "1" in parallel with actual addition of the A*C+B operands which produces a sum representing A*C+B in latch 110. The shift count which is latched in latch 109 is further encoded to form the multiplexor selects to the normalizer 111. Not shown is a further encoding of the shift count to adjust the exponent of the result (required in all floating-point pipelines).

Figure 2:
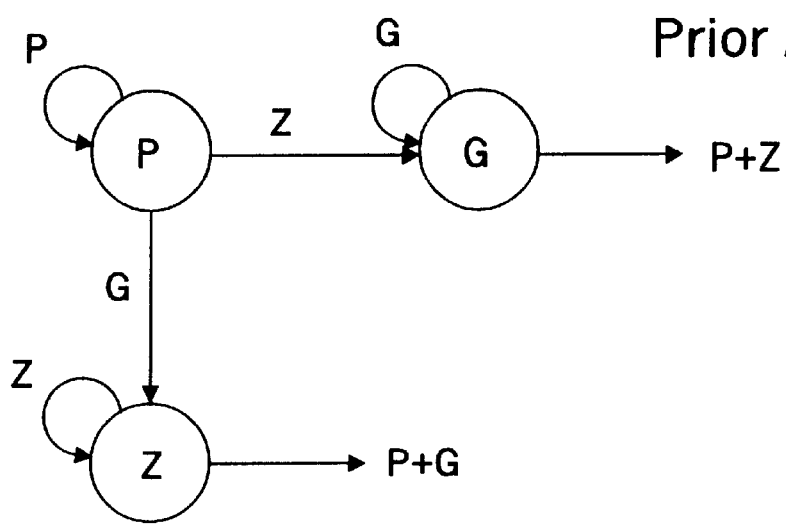
FIG. 2 illustrates a state diagram for the prior art two-input LZA.

A state diagram of the prior art two-input LZA is shown in FIG. 2. For further detail on such prior art LZA's refer to E. Hokenek and R. K. Montoye, *Leading-Zero Anticipator (LZA) in the IBM RISC System/6000 Floating-Point Execution Unit*, IBM Journal of Research and Development, Vol. 34, No. 1, pp. 71–77, 1990. There exist three states called Z, P, and G which are abbreviations for "Zero," "Propagate," and "Generate." These three signals are generated for each bit of the adder inputs. "Z" denotes that both inputs are logic "0." "P" denotes that exactly one input is a logic "1." "G" denotes that both inputs are at a logic "1" state.

The state diagram may be entered at any one of the three states beginning with the state denoted by the leftmost digit of the LZA input vectors. Thus, if the input state were encoded as "PPPZGZPPG", then the state diagram would be entered in state "P."

The state diagram is traversed by examining the succeeding digits in the LZA input vector in a left-to-right order. Traversal of the state diagram terminates when the LZA input vector reaches a terminal state. Thus, with the state vector "PPPZGZPPG" above, a terminal state will be reached upon encountering the first "G" input vector digit.

The state diagram is parallelized and converted to hardware by enumerating all permutations of a three-digit sequence that lead to termination states. Thus, each three-digit sequence denotes a "possible" normalization point. The first-encountered normalization point becomes the actual normalization point.

An enumeration of all possible three-digit sequences that lead to possible normalization points are as follows:
ZZP
ZZG
ZGP
ZGZ
PZZ
PZP
PGP
PGG
GZP
GZG
GGZ
GGP It is also possible to prove that the actual normalization point is uncertain to within one binary digit of the predicted normalization point. That is, while the predicted normalization point lies in the middle of the three-digit "window", the actual normalization point will lie at this same digit or at most one digit to the right.

The state diagram for an N-input LZA is constructed by following the steps below:

1. For each of the N+1 states, draw the states as circles labeled as numbers 0,–1,–2, . . . ,N–1,–N. Note that states are represented as either zero or a negative number.

2. For each state, generate the transition to another state or to termination by multiplying the state number by 2 and adding the corresponding transition number. If the resulting value is equal to a state, then draw a transition arc to this state. If the result is positive or a negative number smaller than the smallest negative state number, then the arc terminates.

Figure 3:
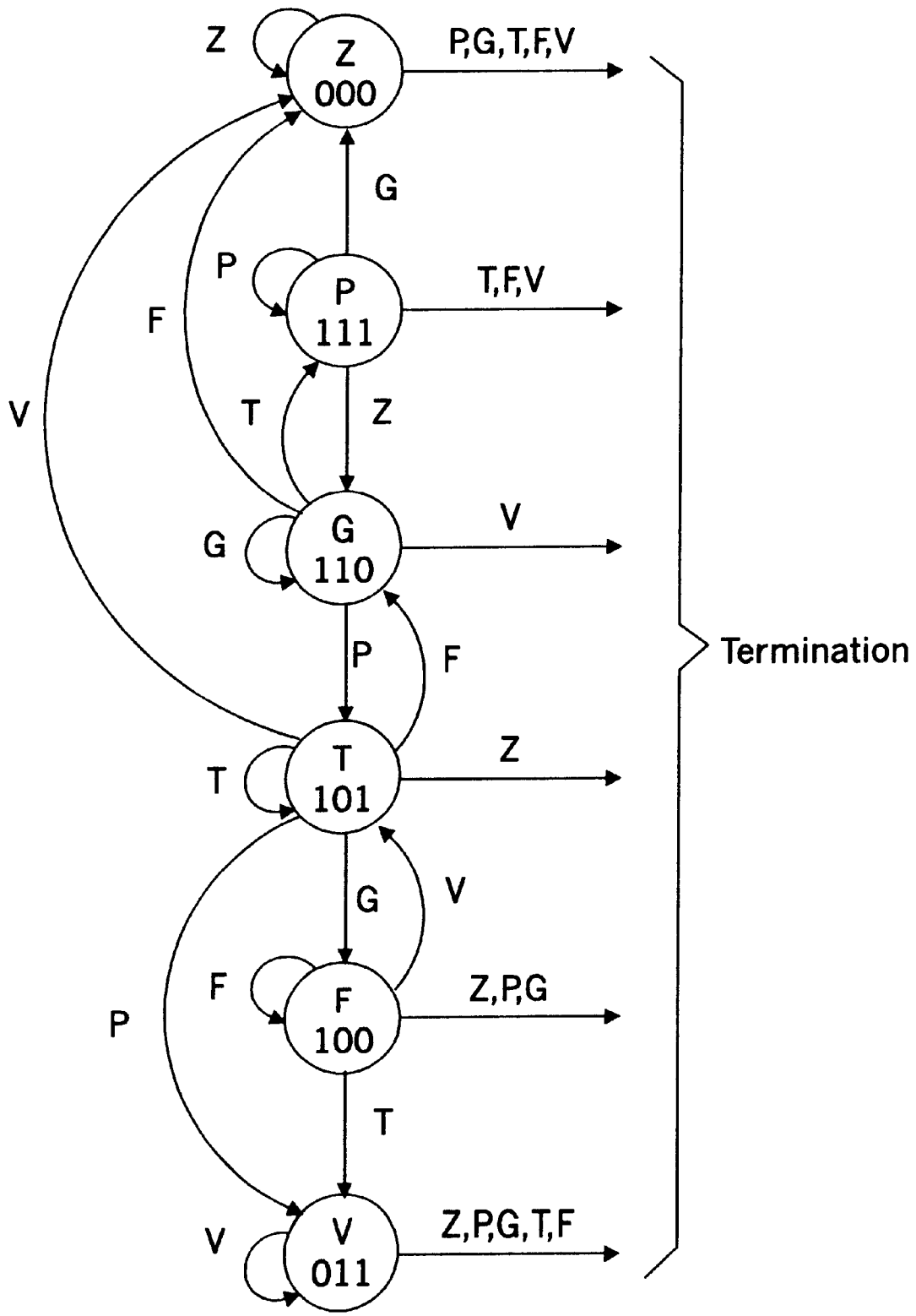
FIG. 3 illustrates, in state diagram form, a 5-input state diagram of the present invention.

From the state diagram of the 5-input LZA illustrated in FIG. 3, the 0 state is labeled Z (for Zero), the –1 state is labeled P (for Propagate), the –2 state is labeled G (for Generate), the –3 state is labeled T (for Three), the –4 state is labeled F (for Five), and the –5 state is labeled V (for Five).

From the diagram it can be seen that the transition G from state F terminates because 2(–4)+2=–6 which is less than the value of the smallest possible state (V, or –5). Similarly, the transition T from state P terminates because 2(–1)+3=1 which is positive. Finally, the transition P from state T transitions to state V because 2(–3)+1=–5.

Note that in the 5-input LZA design, that three state transitions are required to define a state and that two state transitions are insufficient. For example, in the 5-input LZA state diagram, the transition sequence TPP that begins at state T does terminate, but the transition sequence TPP that begins at state G ends in state P and so does not terminate. Thus, two transitions (TP) cannot uniquely define a state.

However, there are three incoming transitions, V, P, T to state T, and three incoming transitions to state G. Therefore, the transition sequence VTPP, PTPP, and TTPP will terminate, and the transition sequence ZTPP, GTPP, and PTPP does not terminate. Therefore, the transition sequence VTP, PTP, and TTP uniquely defines state T, and the transition sequence ZTP, GTP, and PTP uniquely defines state G.

In general, for an N-input LZA, $(\log_2[N+1])+1$ transitions are required to uniquely define a state (where [ ] refer to the "floor" or integer function).

Figure 4:
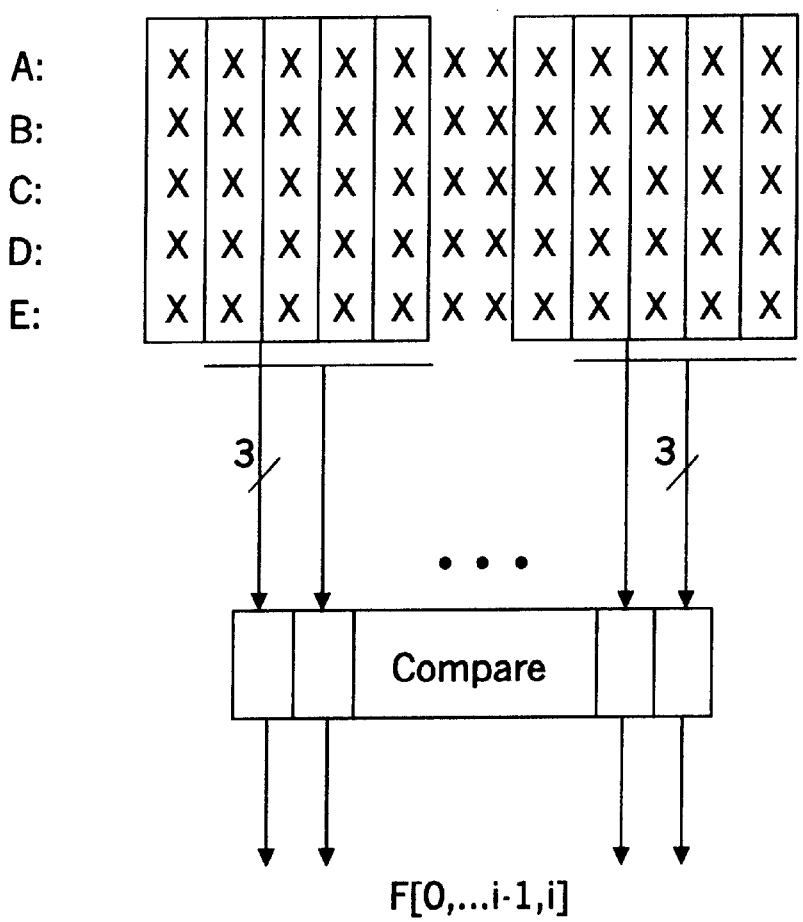
FIG. 4 illustrates, in block diagram form, a 5-input implementation of the present invention.

An implementation which realizes this function for the 5-input LZA is illustrated in FIG. 4. A four-digit sliding "window" contains the bits which are added to form a transition sum. Five inputs of four bits each must be added by any means, such as a combination of carry-save adders and carry-lookahead adders. For each bit position, a three-bit sum is sent to a compare circuit, which outputs a logic "1" if the three-digit sum terminates and is not a valid state (i.e., is positive or is less than the smallest negative state).

Figure 5:
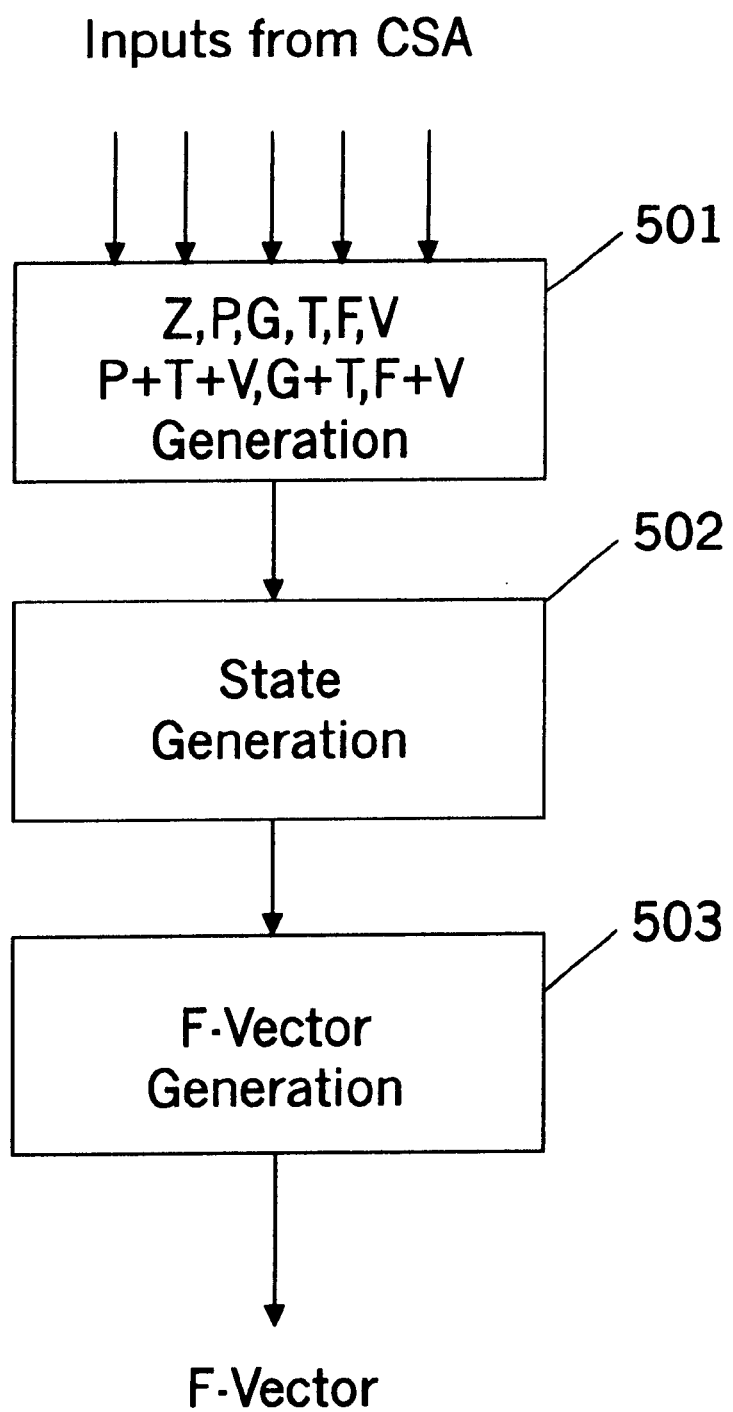
FIG. 5 illustrates, in block diagram form, an implementation of the present invention for 5-inputs.

A block diagram of a five-input LZA is illustrated in FIG. 5. In step 501, the transition terms Z, P, T, G, F, V are generated. These terms refer to the number of LZA inputs which are simultaneously at a logic '1' value. These functions are a combination of all the 32 unique decodes. The Z and V term are composed of one decode term. The P and F transition terms are each the logical OR of five decodes. The G and T terms are each the logical OR of ten decodes:

z=$\overline{abcde}$ p=$a\overline{bcde}$+$\overline{a}b\overline{cde}$+$\overline{ab}c\overline{de}$+$\overline{abc}d\overline{e}$+$\overline{abcd}e$ g=$ab\overline{cde}$+$a\overline{b}c\overline{de}$+$a\overline{bc}d\overline{e}$+$a\overline{bcd}e$+$\overline{a}bc\overline{de}$+$\overline{a}b\overline{c}d\overline{e}$+$\overline{a}b\overline{cd}e$+ $\overline{ab}cd\overline{e}$+$\overline{ab}c\overline{d}e$+$\overline{abc}de$ t=$abc\overline{de}$+$ab\overline{c}d\overline{e}$+$ab\overline{cd}e$+$a\overline{b}cd\overline{e}$+$a\overline{b}c\overline{d}e$+$a\overline{bc}de$+$\overline{a}bcd\overline{e}$+$\overline{a}bc\overline{d}e$+$\overline{a}b\overline{c}de$+$\overline{ab}cde$ f=$abcd\overline{e}$+$abc\overline{d}e$+$ab\overline{c}de$+$a\overline{b}cde$+$\overline{a}bcde$ v=$abcde$ Once these terms are available, they are combined into a binary-coded representation:

$E_2$=P+T+V $E_1$=G+T $E_0$=F+V

For each bit position in which it is desired to obtain a leading-one's prediction, obtain the state-vector (step 502) which represents the possible state leading up to that bit position. This is computed by effectively adding the binary-encoded representation of the transitions for the current bit position, one bit to the left of the current position, and two bits to the left of the current position:

$S_i = 4*[E_2,E_1,E_0]_{i-2} + 2*[E_2,E_1,E_0]_{i-1} + [E_2,E_1,E_0]_i$

Let:

a=$E0_{i-2}$;

b=$E1_{i-2}$;

c=$E2_{i-2}$;

d=$E0_{i-1}$;

e=$E1_{i-1}$;

f=$E2_{i-1}$;

g=$E0_i$;

h=$E1_i$;

i=$E2_i$.

The following state vector calculation calculates the least significant three bits of the state vector. For a five-input LZA, the least-significant three bits of the sum are necessary and sufficient to uniquely represent the state.

| State Vector Calculation | | | | |
|---|---|---|---|---|
| a | b | c | | |
| + | d | e | f | |
| + | | g | h | i |
| | c ⊕ e ⊕ g | f ⊕ h | i | |
| + | f · h | 0 | | |
| [c ⊕ e ⊕ g ⊕ (f · h) | f ⊕ h | i] | | |

Once the lower three bits of the state vector have been computed, then the F-Vector ($F_i$) may be calculated in step 503 as shown below. As in the prior art two-input LZA, the F-Vector is a vector of zeros and ones with the ones representing all possible positions of the leading "1". The first "1" encountered is the position of the leading "1" in the sum, subject to a single-bit uncertainty. For a two-input LZA, the uncertainty is {–0,+1} bits. For an N-input LZA, the resulting uncertainty in the predicted position of the leading "1" is:

Uncertainty ={0,+$\log_2[N]$} bits, where [ ] denotes the "floor" or "integer" function In general, the prediction is made for the rightmost bit which contributes to the state vector. Once the state vector is calculated, a termination condition is signaled if the state is followed by a transition lead to a termination in the graph:

$Termination = Zz$ $P(t + f + v)$ $Gv$ $Tz$ $F(z + p + g)$ $V\overline{v}$ $F_i = \overline{S_{0_i}} * \overline{S_{1_i}} + \overline{S_{2_i}} * \overline{z_{i+1}}$ $\overline{S_{0_i}} * \overline{S_{1_i}} + \overline{S_{2_i}} * tfv_{i+1}$ $\overline{S_{0_i}} * \overline{S_{1_i}} + \overline{S_{2_i}} * z_{i+1}$ $\overline{S_{0_i}} * \overline{S_{1_i}} + \overline{S_{2_i}} * zpg_{i+1}$ $\overline{S_{0_i}} * \overline{S_{1_i}} + \overline{S_{2_i}} * \overline{v}_{i+1}$ In a floating-point pipeline, it is desirable to have the LZA prediction to always be at the leftmost boundary of where the actual leading "1" may be located. This allows easier resolution of the LZA uncertainty. For example, normalization is usually performed in several stages, such as a shift by 16 (shift 0, 16, 32, 48, 64), shift by 4 (shift 0, 4, 8, 12), and shift by 1 (shift 0, 1, 2, 3). If the LZA prediction is used to generate the shift by 16 and shift by 4 control signals and the LZA prediction is never to the right of the actual leading "1" position, then the resulting one-bit uncertainty may be resolved by extending the shift by 1 stage by 1 to allow shift by 0, 1, 2, 3, and 4.

Figure 8:
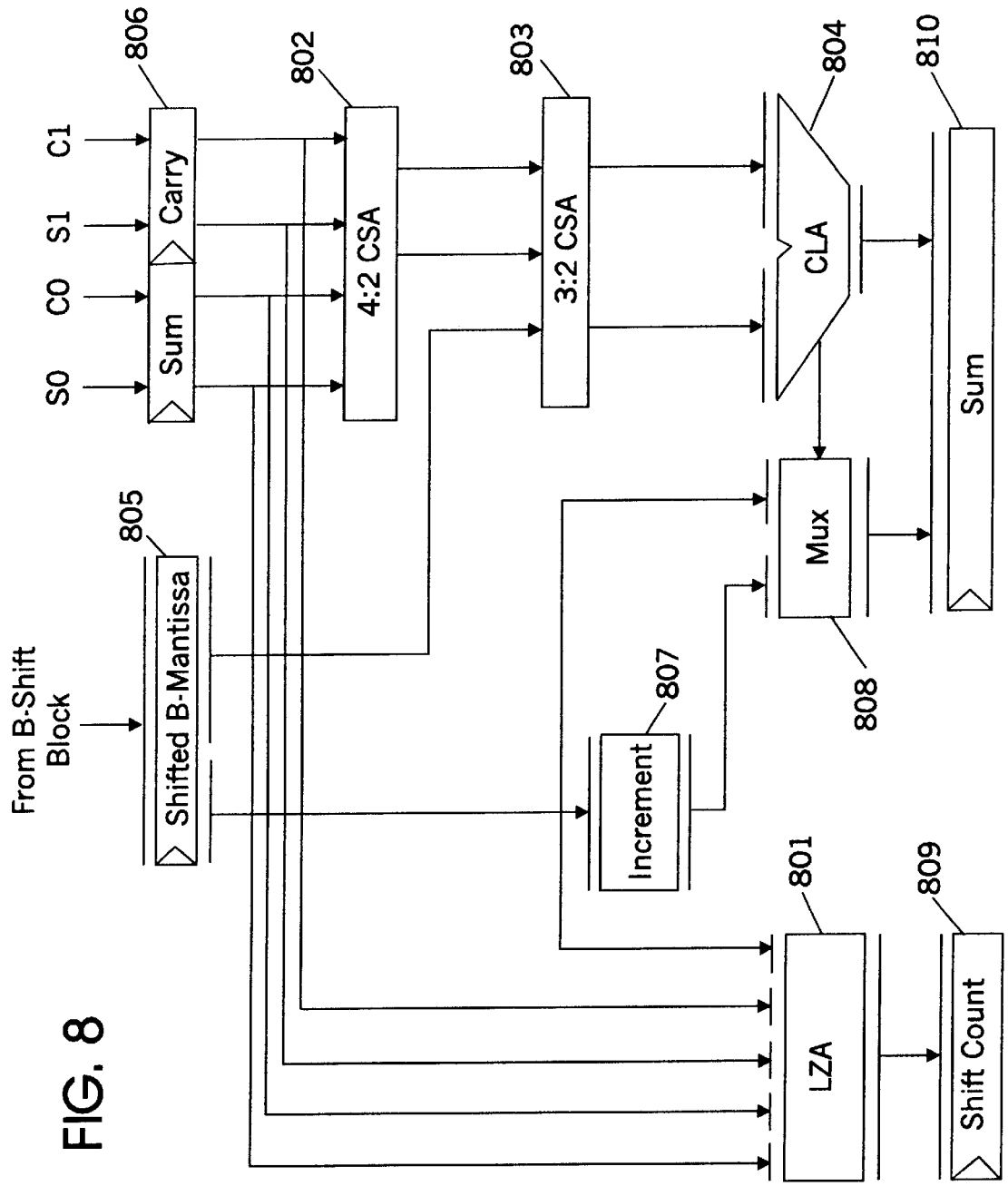
FIG. 8 illustrates, in block diagram form, the adder stage of an implementation of a floating-point pipeline using the present invention.

FIG. 8 represents pipeline stage 2 of the floating-point pipeline of FIG. 1 with the prior art two-input LZA block 101 replaced by the new "high-order" LZA 801, with N=5 (A five-input LZA). LZA 801 takes its inputs directly from the SUM0, CARRY0, SUM1, and CARRY1 inputs, as well as from the Shifted B-Mantissa 805. The inputs to the five-input LZA 801 come directly out of the latch 806 and do not have to go through the 4:2 CSA 802 and 3:2 CSA 803 blocks. Elements 804, 807, 808, 809, 810 operate similarly to blocks 104, 107, 108, 109, 110.

The hardware cost of implementing this method may be reduced by noting that in a typical Wallace tree multiplier array, not all five inputs are required for each input position. For example, FIG. 6 illustrates a representation of the booth encoded partial products in a Wallace tree for a single-precision multiplier.

FIG. 6 was described previously. Again, it is the representation of the thirteen partial products which form the A*C product. FIG. 6 shows that some hardware can be saved by using a three-input LZA (implied by the current invention) for the first ten bits of the thirteen partial products and for the last fourteen bits of the thirteen partial products. Pipeline stages 1 and 2 would have to be slightly modified for this version of the invention, but it is recognized that anyone of ordinary skill in the art will be able to modify this invention in order to use the slightly smaller version of the invention implied by FIG. 6.

The following example will illustrate how the present invention operates. Assume the following values for the sum and carry-out of each CSA as well as the B-vector:

A: 0000 0000 0000 0001 0100 1010 0101 1110 0000 1010 1110 0011 0010

B: 0000 0001 0001 0001 0000 0000 0111 0101 0000 1010 1010 1010 1000

C: 0000 1101 0001 0101 1111 1111 1111 0001 1010 1010 1000 0001 0000

D: 0000 1101 0101 1001 0101 0000 0000 0001 0000 0000 0000 0000 0000

E: 1101 1111 1011 1001 1010 1010 1111 0101 0101 1011 1111 1111 1110

Transitions: ppzp ttpf pgpf gpzv gtgg tptp gttf ptpf pppp tzfp fgtp gptt gpgz

Scan the transitions three bits at a time beginning from the left:

ppzp: In G-State with P-transition. No termination.

pzpt: In T-State with T-transition. No termination.

zptt: In T-State with T-transition. No termination.

pttp: In T-State with P-transition. No termination.

ttpf: In V-State with F-transition. Termination.

Therefore, the F-vector will begin:

00001 . . .

To check, convert the digits above to hexadecimal for easy addition:

A=0001 4A5E 0AE3 2

B=0111 0075 0AAA 8

C=0D15 FFF1 AA81 0

D =0D59 5001 0000 0

E =DFB9 AAF5 5BFF E

Sum is: FB3B 45BB 1C0E 8

In Binary, this is:

1111 1011 0011 1011 0100 0101 1011 1011 0001 1100 0000 1110 1000

This number is negative, and the prediction is that bit 4 is the predicted leading "1" (or "0"). This is well within the 2-digit uncertainty "window."

It has been shown how to construct the state diagram for a high-order leading zero anticipator, that is, an LZA with an arbitrary number of inputs. Using this invention, it is possible to begin and end the leading zero anticipation finction much earlier in the floating-point pipeline than earlier possible. Therefore, this invention may lead to significantly faster floating-point designs.

Figure 7:
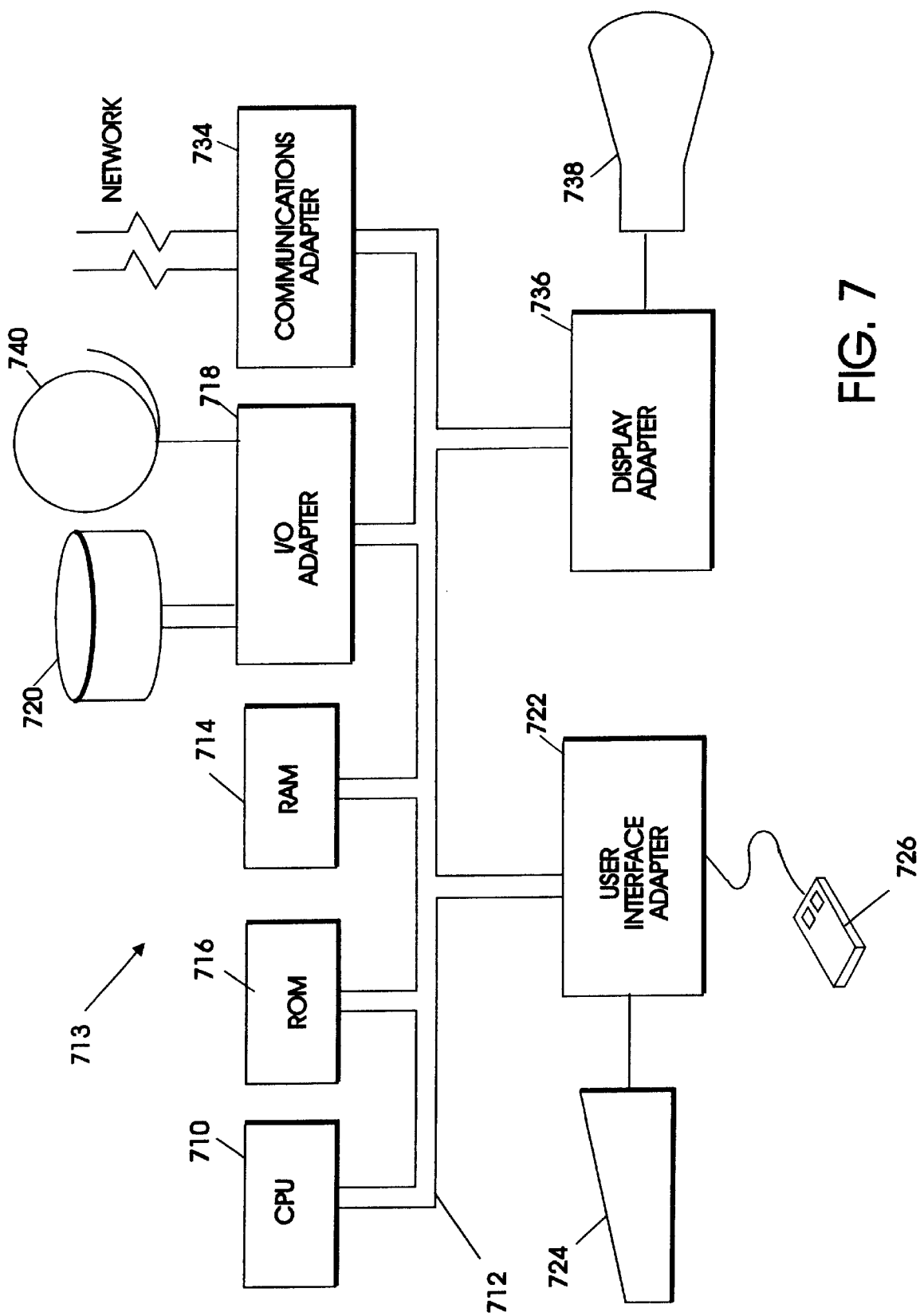
FIG. 7 illustrates a data processing system in accordance with the present invention.

A representative hardware environment for practicing the present invention is depicted in FIG. 7, which illustrates a typical hardware configuration of workstation 713 in accordance with the subject invention having central processing unit (CPU) 710, such as a conventional microprocessor, and a number of other units interconnected via system bus 712. CPU 710, or other units within workstation 713 may make use of the present invention. Workstation 713 includes random access memory (RAM) 714, read only memory (ROM) 716, and input/output (I/O) adapter 718 for connecting peripheral devices such as disk units 720 and tape drives 740 to bus 712, user interface adapter 722 for connecting keyboard 724, mouse 726, and/or other user interface devices such as a touch screen device (not shown) to bus 712, communication adapter 734 for connecting workstation 713 to a data processing network, and display adapter 736 for connecting bus 712 to display device 738. CPU 710 may include other circuitry not shown herein, which will include circuitry commonly found within a microprocessor, e.g., execution unit, bus interface unit, arithmetic logic unit, etc. CPU 710 may also reside on a single integrated circuit.

Although the present invention and its advantages have been described in detail, it should be understood that various changes, substitutions and alterations can be made herein without departing from the spirit and scope of the invention as defined by the appended claims.

What is claimed is:

1. A floating point pipeline comprising:

latches for receiving A, B, and C mantissas;

a multiplier for multiplying the A and C mantissas and for then compressing a product of such multiplication into sum and carry values;

circuitry for shifting the B mantissa; and an LZA, directly coupled to the shifting circuitry, receiving the sum and carry values and the shifted B mantissa.

2. A processor operable for executing floating point instructions, comprising a floating point execution unit further comprising:

latches for receiving A, B, and C mantissas;

a multiplier for multiplying the A and C mantissas and for then compressing a product of such multiplication into sum and carry values;

circuitry for shifting the B mantissa; and an LZA, directly coupled to the shifting circuitry, receiving the sum and carry values and the shifted B mantissa.

3. A data processing system comprising:

a storage device;

a memory;

a bus system; and a processor coupled to the storage device and the memory by the bus system, wherein the processor is operable for executing floating point instructions, the processor further including a floating point execution unit further comprising:

latches for receiving A, B, and C mantissas;

a multiplier for multiplying the A and C mantissas and for then compressing a product of such multiplication into sum and carry values;

circuitry for shifting the B mantissa; and an LZA, directly coupled to the shifting circuitry, receiving the sum and carry values and the shifted B mantissa.

* * * * *